C. PARK.
WAGON-SKEIN.
No. 174,149. Patented Feb. 29, 1876.
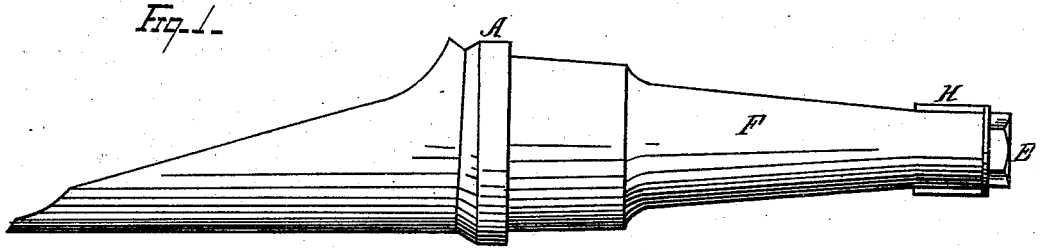
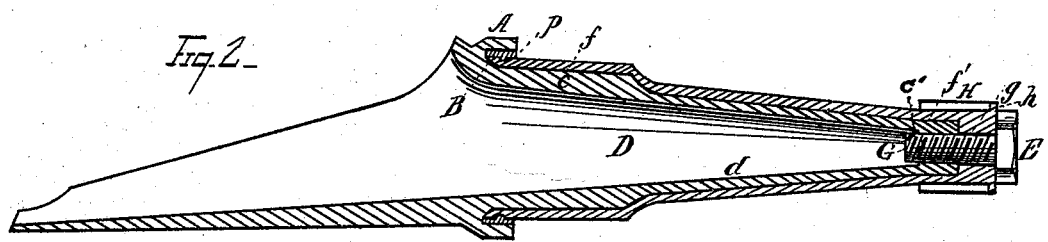

UNITED STATES PATENT OFFICE.

CHESTER PARK, OF WARREN, PENNSYLVANIA.

IMPROVEMENT IN WAGON-SKEINS.

Specification forming part of Letters Patent No. 174,149, dated February 29, 1876; application filed January 3, 1876.

*To all whom it may concern:*

Be it known that I, CHESTER PARK, of Warren, in the county of Warren and State of Pennsylvania, have invented certain new and useful Improvements in Wagon-Skein; and I do hereby declare the following to be a full, clear, and exact description of the invention, such as will enable others skilled in the art to which it pertains to make and use it, reference being had to the accompanying drawings, which form part of this specification.

This invention relates to certain improvements in axle-skeins; and its object is to distribute the weight of the vehicle and strain upon the wheels on the axle in such a manner that the boxes will not tend to crowd inward against the shoulder of the skein, or be caused to be forced outward and displace the nut that secures the box to the skein.

Another object to be attained by this invention is to retain the lubricant upon the axle.

In the accompanying drawings, Figure 1 shows a side view of the skein, having the box secured thereto; and Fig. 2 shows a longitudinal section of the skein and box.

This invention consists, first, in a wagon-skein having a tapering inner bearing and a cylinder outer or end-bearing; second, in the combination, with an axle-box having a groove formed around its inner end, of a skein provided with an overlapping flange, and suitable packing interposed between the flange and box.

In the drawings, D is the axle-skein, formed open from its inner shoulder, to allow of its ready attachment to the hounds or bearings, which serves to strengthen the axle. A is the overlapping flange of the skein, and $c$ $c'$ are, respectively, the inner and outer end bearings of the skein, while $d$ is the tapering arm. The box F has bearings $f$ $f'$ corresponding to bearings $c$ $c'$ of the skein.

By means of this construction, it will be seen that the weight brought to bear upon the skein will always be at right angles to the axle, whether the wheel be straight or dished, and this feature remains unchanged whether the box has much or little end play.

The box F has formed around its inner end a groove, B, which serves to retain suitable packing $p$ between the box and flange A, and thereby exclude dust from the axle, and retain the lubricant upon the same. The outer end of the box F is formed with a cap, $g$, through which passes a bolt or other fastening device, to be secured to the skein.

As at present shown the bolt G has a head, E, formed on its outer end, and the same may be adjusted by a common wrench.

A flat or disk spring may be substituted for the nut E, and allow of a variable and self adjustment of the box F.

A flange or collar, $h$, is formed on the outer end of the box F, to prevent displacement of the hub from the box, should the hub become loose from shrinkage or other cause.

The hub may be made shorter, with the same length of arm, than those in ordinary use, as on other skeins the projection is necessarily greater to receive the nut, while in my improvement the nut is separated from the end of the skein only by the outer cap of the box.

As the bolt G is made to closely fit the opening formed in the cap $e$, and its head E effectually packs said opening, it will be impossible for oil to escape from the box and soil the hub, as is often the case with ordinary boxes.

Having fully described my invention, what I claim, and desire to secure by Letters Patent, is—

1. An axle-skein, having tapering inner bearing $c$ and cylindrical outer or end bearing $c'$, substantially as and for the purpose specified.

2. The combination of an axle-skein, having an overlapping flange, A, of the box, provided with groove B, and packing-ring $p$; substantially as and for the purpose described.

In testimony that I claim the foregoing I have hereunto set my hand this 30th day of December, 1875.

CHESTER PARK.

Witnesses:
D. J. HODGES,
T. C. JACKSON.